(12) United States Patent
Chan

(10) Patent No.: US 9,607,097 B2
(45) Date of Patent: Mar. 28, 2017

(54) METHOD AND SYSTEM FOR EDGE SERVER CACHE

(75) Inventor: Shu Kit Francis Chan, Foster City, CA (US)

(73) Assignee: EXCALIBUR IP, LLC, Sunnyvale, CA (US)

(*) Notice: Subject to any disclaimer, the term of this patent is extended or adjusted under 35 U.S.C. 154(b) by 48 days.

(21) Appl. No.: 13/430,044

(22) Filed: Mar. 26, 2012

(65) Prior Publication Data

US 2013/0254342 A1   Sep. 26, 2013

(51) Int. Cl.
*G06F 15/16* (2006.01)
*G06F 17/30* (2006.01)
*H04L 29/08* (2006.01)

(52) U.S. Cl.
CPC .... *G06F 17/30902* (2013.01); *H04L 67/2842* (2013.01)

(58) Field of Classification Search
CPC . H04L 67/2842; H04L 63/0281; H04L 67/28; H04L 67/2814; H04L 67/18; H04L 67/1002; H04L 67/04; H04L 69/08; G06F 17/30902; H04W 4/18; H04W 80/12; H04W 88/16

USPC .................. 709/219, 238–244, 226
See application file for complete search history.

(56) References Cited

U.S. PATENT DOCUMENTS

| | | | |
|---|---|---|---|
| 2002/0107935 A1* | 8/2002 | Lowery et al. | 709/216 |
| 2003/0208570 A1* | 11/2003 | Lapidous | 709/222 |
| 2005/0198238 A1* | 9/2005 | Sim et al. | 709/222 |
| 2007/0088805 A1* | 4/2007 | Cyster | 709/217 |
| 2008/0244076 A1* | 10/2008 | Shah et al. | 709/227 |
| 2011/0282997 A1* | 11/2011 | Prince et al. | 709/226 |
| 2011/0295979 A1* | 12/2011 | Alstad et al. | 709/219 |
| 2012/0079369 A1* | 3/2012 | Harris et al. | 715/239 |
| 2012/0265843 A1* | 10/2012 | Nadler | 709/217 |
| 2013/0080611 A1* | 3/2013 | Li et al. | 709/223 |

* cited by examiner

*Primary Examiner* — Abdulkader M Alriyashi
(74) *Attorney, Agent, or Firm* — Pillsbury Winthrop Shaw Pittman LLP

(57) ABSTRACT

Systems and methods for fault tolerant content delivery. A request is received from a user for customized content on the network, the request for customized content comprising an identifier for the content and identification information. The request is forwarded from the user for the customized content over the network. Generic content corresponding to the customized content is stored in a cache for future use. The generic content is sent to the user if no customized content is received in response to the forwarded request from the user.

12 Claims, 16 Drawing Sheets

METHOD AND SYSTEM FOR EDGE SERVER CACHE

BACKGROUND

1. Technical Field

The present teaching relates to methods, systems, and programming for serving web pages. Particularly, the present teaching is directed to methods, systems, and programming for fault tolerant web servers.

2. Discussion of Technical Background

Occasionally, servers may stop serving content because of, for example, erroneous code pushes, editorial mistakes, or capacity overload. These stoppages give users a bad experience because users are either shown a standard error page with little information that is helpful to the user, or the software that the user using stops working or freezes. Such experiences cause users to become frustrated and migrate to alternative servers of content. This may cause the owner of the servers to lose revenue, or may cause the company to lose money because of the disruption caused to the employees of the company that use the service.

Servers are usually configured to notify service engineers, when problems arise with delivering content. The service engineers are often notified either automatically through some monitoring system or manually by customers or customer care representatives. The notifications may happen in a timely manner, but then the service engineers may take time to find the cause of the problem immediately. Further, the service engineers may have to enlist the help of other teams and engineers to tackle the problem. During this time, the users may continue to receive poor service. The need to restore quickly the service means that a large number of qualified engineers need to be on staff 24 hours a day to fix the issues quickly. This is expensive for the owner of the server that would prefer to fix problems during normal working hours when the costs are not so great.

SUMMARY

The teachings disclosed herein relate to methods, systems, and programming for providing content reliably. More particularly, the present teaching relates to methods, systems, and programming for providing a backup service, when other systems fail.

In one example, a method implemented on a machine having at least one processor, storage, and a communication platform connected to a network for providing fault tolerant content delivery is disclosed. A request is received from a user for customized content on the network, the request for customized content comprising an identifier for the content and identification information. The request is forwarded from the user for the customized content over the network. Generic content corresponding to the customized content is stored in a cache for future use. The generic content is sent to the user if no customized content is received in response to the forwarded request from the user.

In another example, a system for reliable content delivery is disclosed, the system comprising a receiver, a cache, a cached content determining unit, and a content delivery unit. The receiver configured for receiving a request from a user, over a network for customized content. The cache configured for storing a first set of generic content. The cached content determining unit configured for determining whether generic content corresponding to the requested customized content is a part of the first set of generic content. The content delivery unit configured for transmitting content to the user, wherein the content transmitted to the user corresponds to the generic content corresponding to the requested customized content if no customized content is received and the generic content corresponding to the requested customized content is cached in the cache.

Other concepts relate to software for using the interests of users in real-time with minimum processing power. A software product, in accord with this concept, includes at least one machine-readable non-transitory medium and information carried by the medium. The information carried by the medium may be executable program code data regarding parameters in association with a request or operational parameters, such as information related configuration of edge servers etc.

In one example, machine-readable tangible and non-transitory medium having information recorded thereon, wherein the information, when read by a machine, causes the machine to perform a fault tolerant content delivery method is disclosed. A request is received, by a first server, from a user for customized content on the network, the request for customized content comprising an identifier for the content and identification information. The request is forwarded from the user for the customized content to a second server on the network. Generic content corresponding to the customized content is stored by the first server in a cache for future use. The generic content is sent to the user if no customized content is received in response to the forwarded request.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Figure 1:
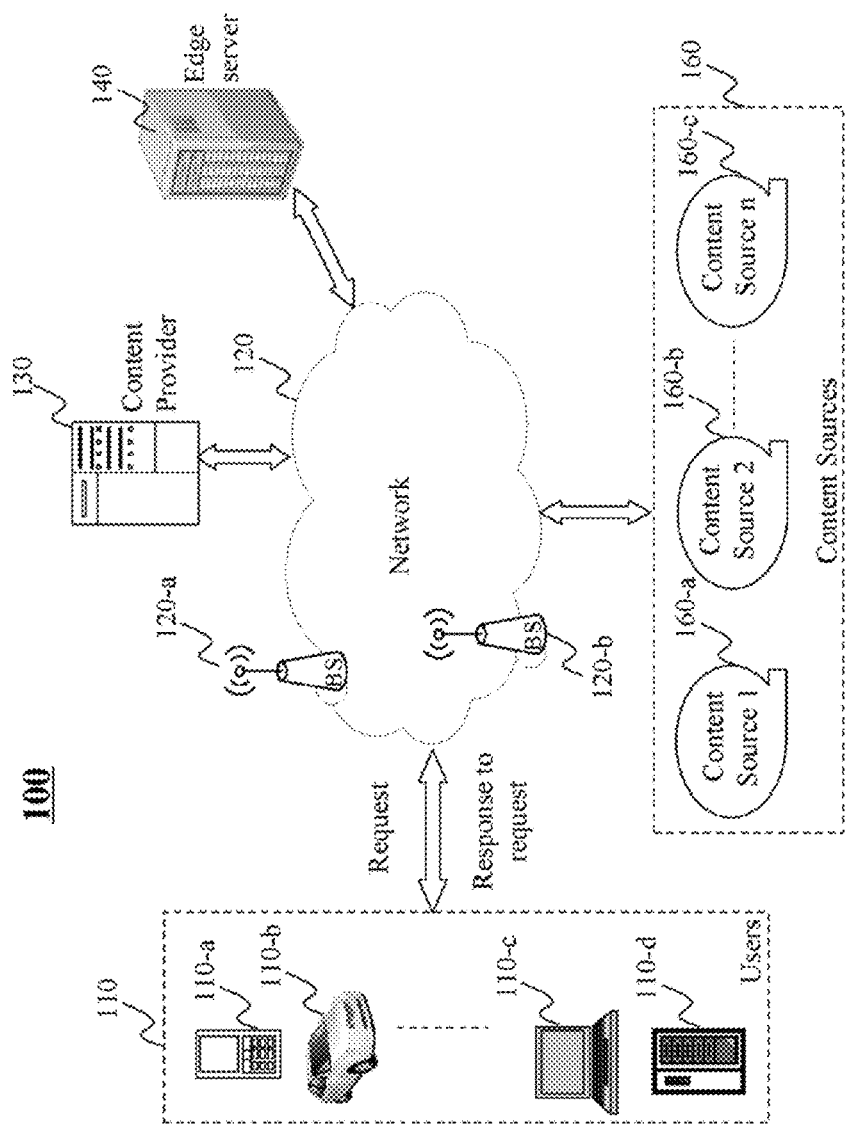
FIG. 1 is a high-level depiction of an exemplary system in which a fault tolerant edge server for fault tolerant content provision is deployed according to an embodiment.

FIG. 1 is a high-level depiction of an exemplary system 100; in which a fault tolerant edge server 140 for fault tolerant content provision is deployed, according to a first application embodiment of the present disclosure. The exemplary system 100 includes users 110, a network 120, a content provider 130, content sources 160, and the fault tolerant edge server 140. The network 120 can be a single network or a combination of different networks. For example, a network can be a local area network (LAN), a wide area network (WAN), a public network, a private network, a proprietary network, a Public Telephone Switched Network (PSTN), the Internet, a wireless network, a virtual network, or any combination thereof. A network may also include various network access points, e.g., wired or wireless access points such as base stations or Internet exchange points 120-a, . . . , 120-b. Using the wired or wireless access points a data source may connect to the network 120 in order to transmit information via the network 120.

Users 110 may be of different types such as users connected to the network via desktop connections (110-d), users connecting to the network via wireless connections such as through a laptop (110-c), a handheld device (110-a), or a built-in device in a motor vehicle (110-b). A user may send a request to the content provider 130 via the network 120 and the fault tolerant edge server 140 and receive a request result from the content provider 130 through the network 120 and fault tolerant edge server 140. The request result may be provided directly by the content provider 130 or obtained by the content provider 130 from any one of a number of content sources 160. The content sources 160 include multiple content sources 160-a, 160-b, . . . , 160-c. A content source may correspond to a web page host corresponding to an entity. The web page host may be an individual, a business, or an organization such as USPTO.gov, a content provider such as cnn.com and Yahoo.com, or a content feed source such as tweeter or blogs. The fault tolerant edge server 140 provides fault tolerant web services to the users 110. Both the content provider 130 and the fault tolerant edge server 140 may access information from any of the content sources 160-a, 160-b, . . . , 160-c. The content provider 130 may rely on such information to respond to a request (e.g., the content provider 130 provides web content corresponding to the request and returns the web content to a user via the fault tolerant edge server 140).

In the exemplary system 100, a user 110 may initially send a request for a web page from the fault tolerant edge server 140 via the network 120. The request is forwarded to the content provider 130 via the network 120. The content provider 130 provides the requested content to the fault tolerant edge server 140 via the network 120. The fault tolerant edge server 140 forwards the requested content to the user 110 via the network 120. If the content provider 130 fails to provide the content requested to the fault tolerant edge server 140 then the fault tolerant edge server 140 substitutes cached generic content corresponding to the request and provides the cached content to the user 110. The cached generic content is cached by the fault tolerant edge server 140 in response to previous requests by users 110. Thus, more popular content is more likely to be cached. The cached generic content is content that is not specific to a particular user 110. The generic content is sometimes known as "the static content" as opposed to "dynamic content" or "customized content." Dynamic or customized content is content customized for, for example, the user 110, a user's device, a user's web browser, a user's language, a user's location etc. The above fault tolerant edge server 140 allows a service engineer more flexibility to correct issues with the content provider 130 when those issues occur.

Figure 2:
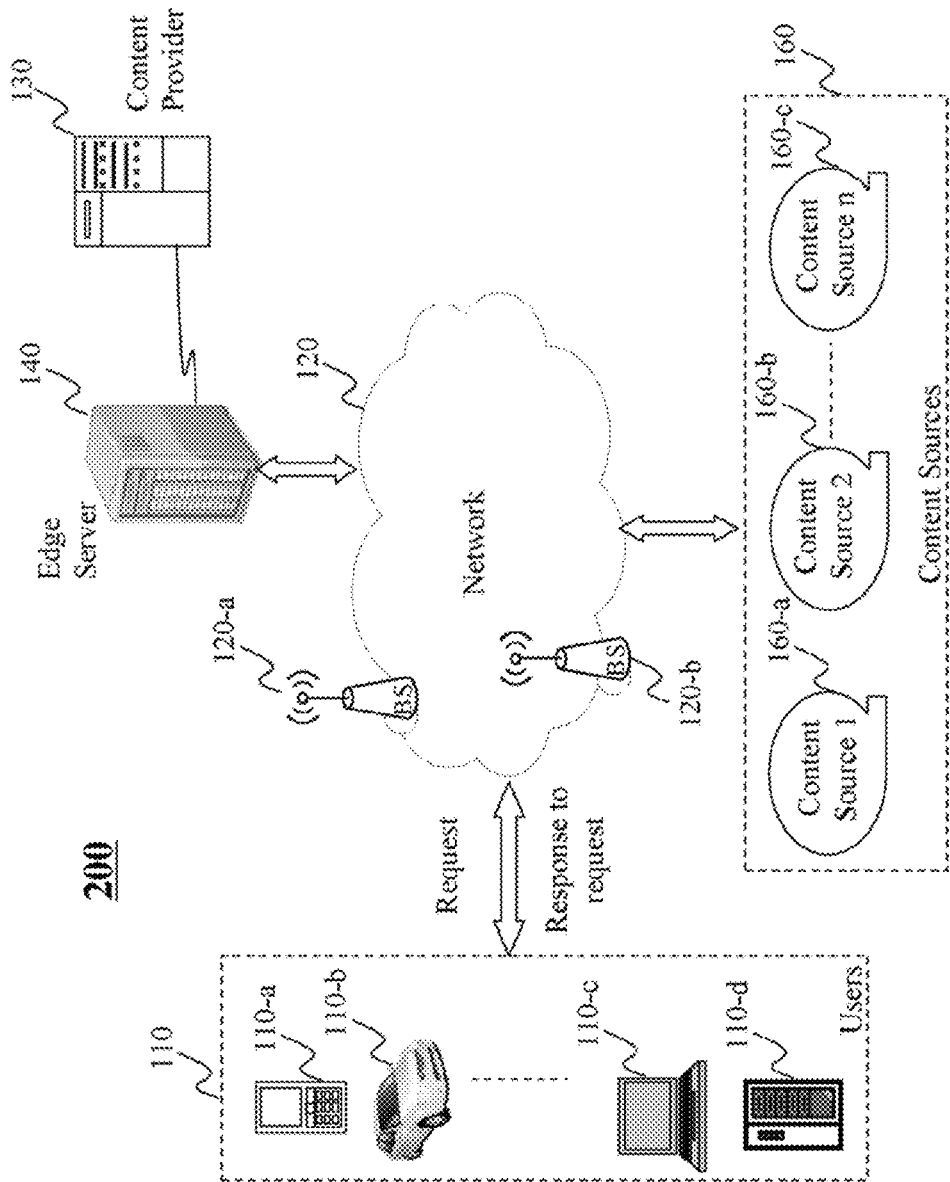
FIG. 2 is a high-level depiction of an exemplary system in which a fault tolerant edge server is deployed according to an embodiment.

FIG. 2 is a high-level depiction of an exemplary system 200 in which the fault tolerant edge server 140 is deployed to provide content to users 110, according to a second application embodiment of the present teaching. In this embodiment, the fault tolerant edge server 140 serves as a front end system of the content provider 130. All requests are sent to the fault tolerant edge server 140, which forwards the request to the content provider 130 to process the request. The content provider 130 provides the requested content to the fault tolerant edge server 140. The fault tolerant edge server 140 forwards the requested content to the user 110 via the network 120. If the content provider 130 fails to provide the content requested to the fault tolerant edge server 140 then the fault tolerant edge server 140 substitutes cached generic content corresponding to the request and provides the cached content to the user 110.

Figure 3:
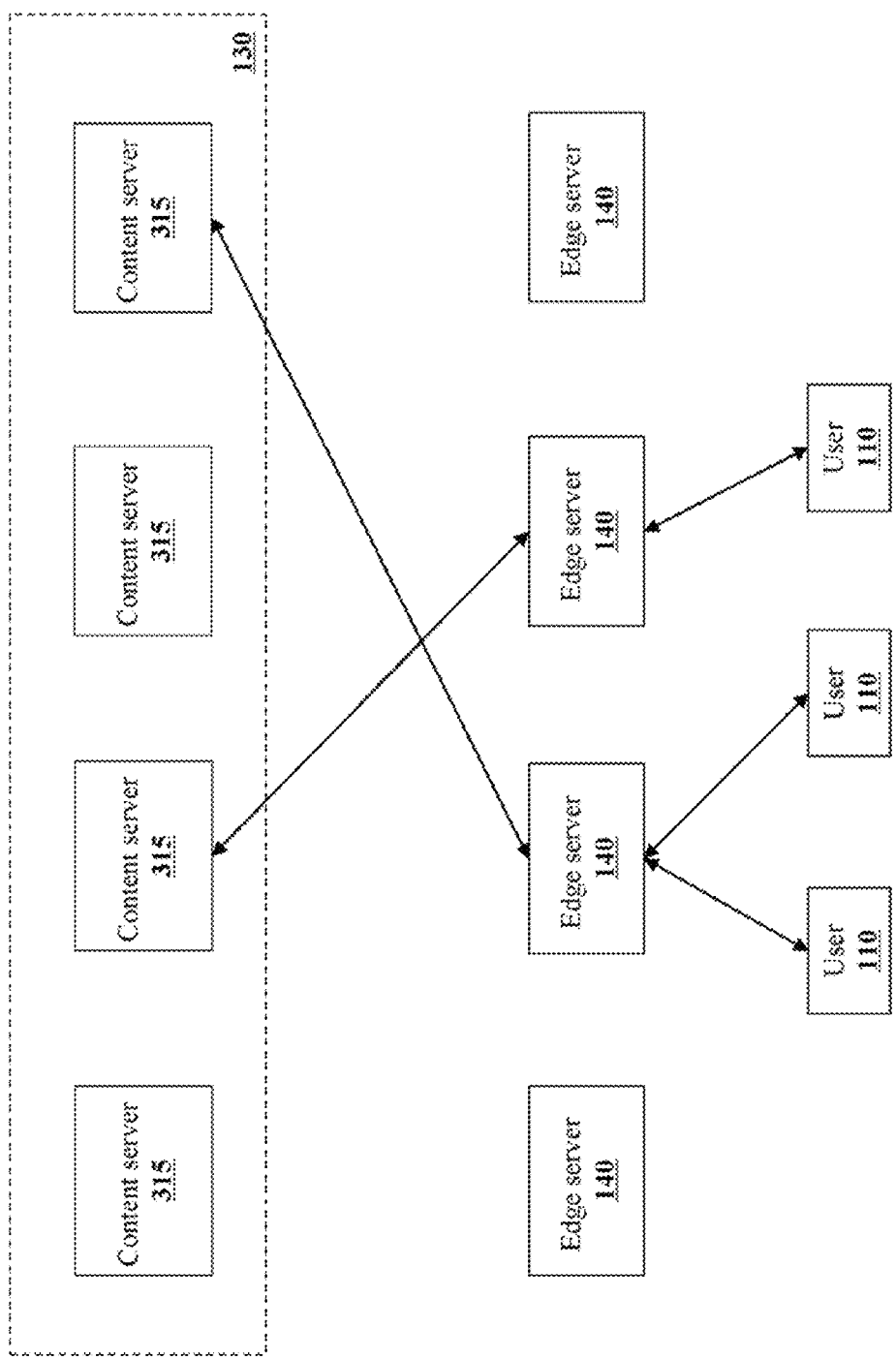
FIG. 3 is a high-level depiction of an exemplary system in which a fault tolerant edge servers are deployed according to an embodiment.

FIG. 3 depicts a structure of an Internet service provider according to an embodiment. Internet service provider systems are arranged hierarchically depending upon function. Edge servers 140 provide an interface to users 110. There may be any number of edge servers 140, and a user 110, may connect to any one of the edge servers 140 to request content. The edge servers 140 in turn contact content servers 315 of the content provider 130. The content servers 315 may each correspond to a different type of content. For example, one of the content servers 315 may be a mail server, another of the content servers 315 may provide news. Yet another of the content servers 315 may provide social networking. The edge servers 140 are adapted to forward content requests to the appropriate content server 315. The page building servers 315, may in turn contact backend servers for raw data.

Figure 4:
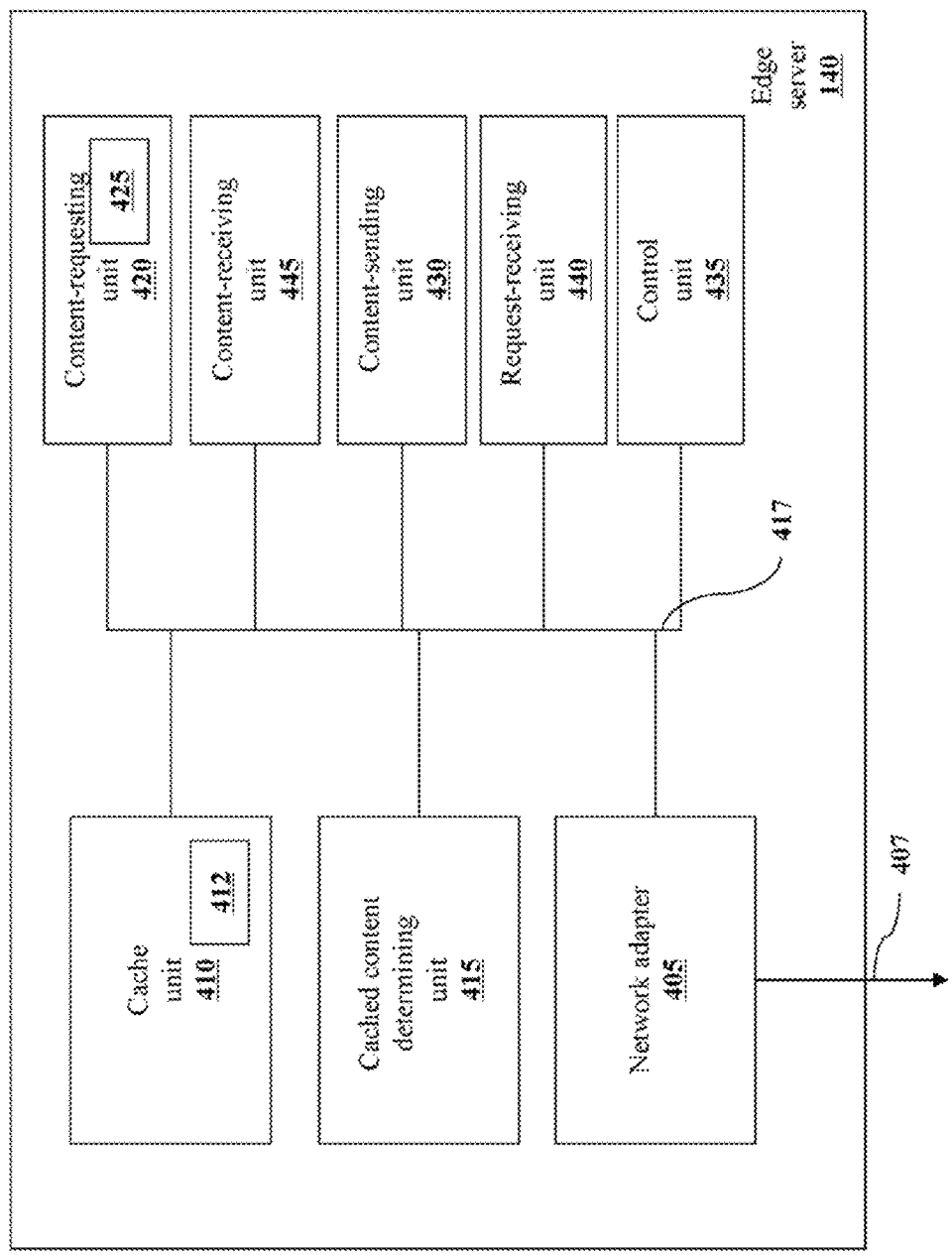
FIG. 4 is a depiction of a fault tolerant edge server according to an embodiment.

FIG. 4 is a depiction of the fault tolerant edge server 140 according to an embodiment. The fault tolerant edge server 140 comprises a network adapter 405, a cache unit 410, a network 417, a content-requesting unit 420, a content-sending unit 430, a control unit 435, and request-receiving unit 440, and content-sending unit 445.

The network adapter 405, enables the edge servers 140 to communicate with users 110 and content servers 315 of content provider 130, via network connection 407. The network adapter 405 receives requests for content from users 110, forwards requests for content from the content request unit 420, and receives the content from the content provider 130.

The cache unit 410 is for storing cached content 412. The cached content is generic content to be provided to the users 110, if customized content cannot be provided.

The network 417 enables communication between the network adapter 405, the cache unit 410, the cached content determination unit 415, the content requesting unit 420, and the content sending unit 430. The network 417 may be a part of the Internet, an intranet, or a communication bus within a computer or computer system.

The content-requesting unit 420, requests content from the content servers 315 of content provider 130, in response to a request for content from a user 110. The content-requesting unit 420 further comprises a timeout unit 425. The timeout unit causes the content request unit 420, to assume that requested content will not be delivered when the timer has expired for the requested content. The content-sending unit 430, forwards content received from a content provider to the user via the network adapter 405. The control unit 435 controls the network adapter 405, the cache unit 410, cache content determining unit 415, the content request unit 420, and the content sending unit 430.

The request-receiving unit 440 receives requests from, for example, users 110 via the network adapter 405, and forwards the requests to the content-requesting unit 420. The content-sending unit 445 sends the requested content from the content provider 130 to the user 110. If the requested content is not received from the content provider 130, the content sending unit sends available corresponding generic content 412 from the cache unit 410 to the user 110.

Figure 5:
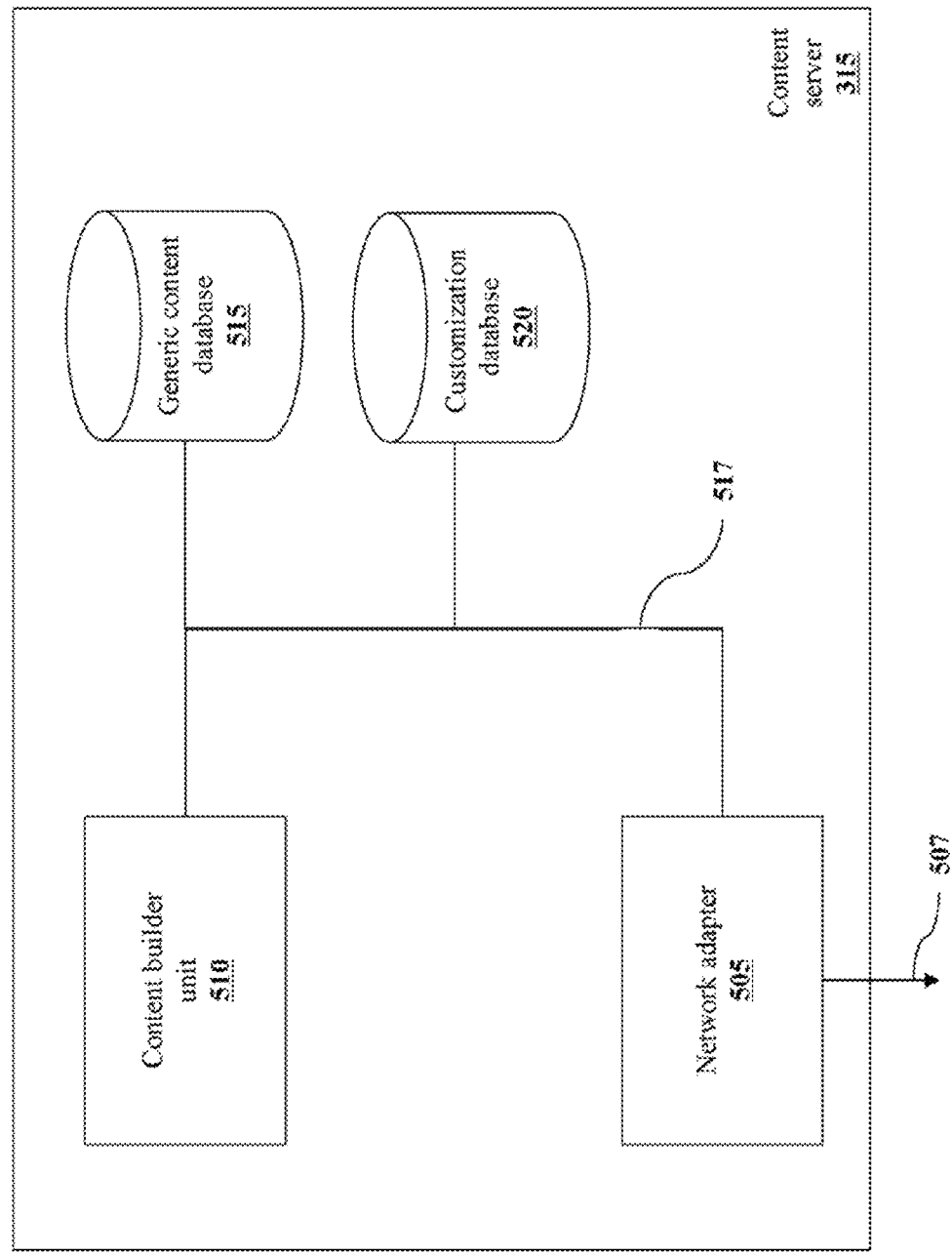
FIG. 5 is a depiction of a content server according to an embodiment.

FIG. 5 is a depiction of a content server 315 according to an embodiment. The content server 315 comprises a network adapter 505, a content builder unit 510, a network 517, a generic content database 515, and a customization database 520.

The network adapter 505 enables the content server 315 to communicate with edge servers 140 and content sources 160, via network connection 507. The network adapter 505 receives a request for content from edge servers 140 and forwards requests for content to the content builder unit 510. The network adapter 505 forwards content produced by the content builder back to the edge servers 140.

The content builder unit 510, obtains generic content from the generic content database 515. If customized content is requested, obtains customization data from customization database 520. The content builder unit 510 builds the content based on the generic content and if requested customizes the generic content using the customization data. A request that includes an identity of a user that requested the content is one manner in which the content builder unit 510 identifies which requests to customize. In some embodiments, any manner in which to identify which content to customize is within the scope of this disclosure. The content builder 510 sends the customized content to the requesting edge server 140 via the network adapter 505. If there is no request to customize the content, and no identification of a user, then the content builder unit 510 sends the generic content to the requesting edge server 140 via the network adapter 505.

The network 517, enables communication between the network adapter 505, the content builder unit 510, the generic content database 515, and the customization database 520. The network 517 may be a part of the Internet, an intranet, or a communication bus within a computer or computer system.

The generic content database 515, stores predetermined generic content specified by the operator of the content provider. The generic content may be web pages, web page templates, Java scripts, PHP scripts, or any other form of content that can be sent across a network to a user.

The customization database 520 stores data to customize the generic content. The customization database 520 stores, for example, data regarding users such as user names, personal information about the users, social connections of users, favorite sites of users, or any other information that may be used to customize a generic webpage or generic content.

Figure 6:
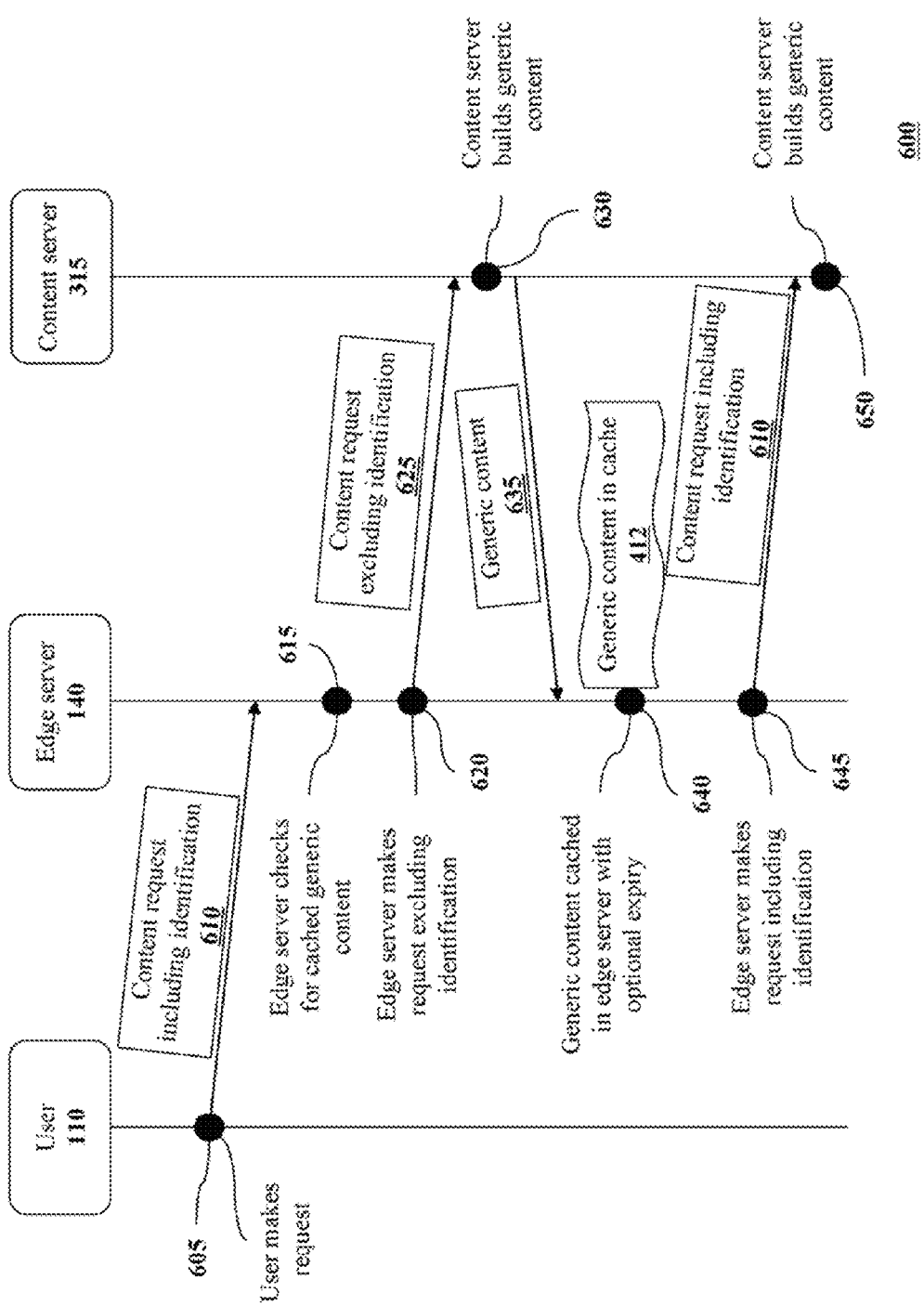
FIG. 6 is a time-line chart for a caching process and content request following a content request for generic content according to an embodiment.
Figure 7:
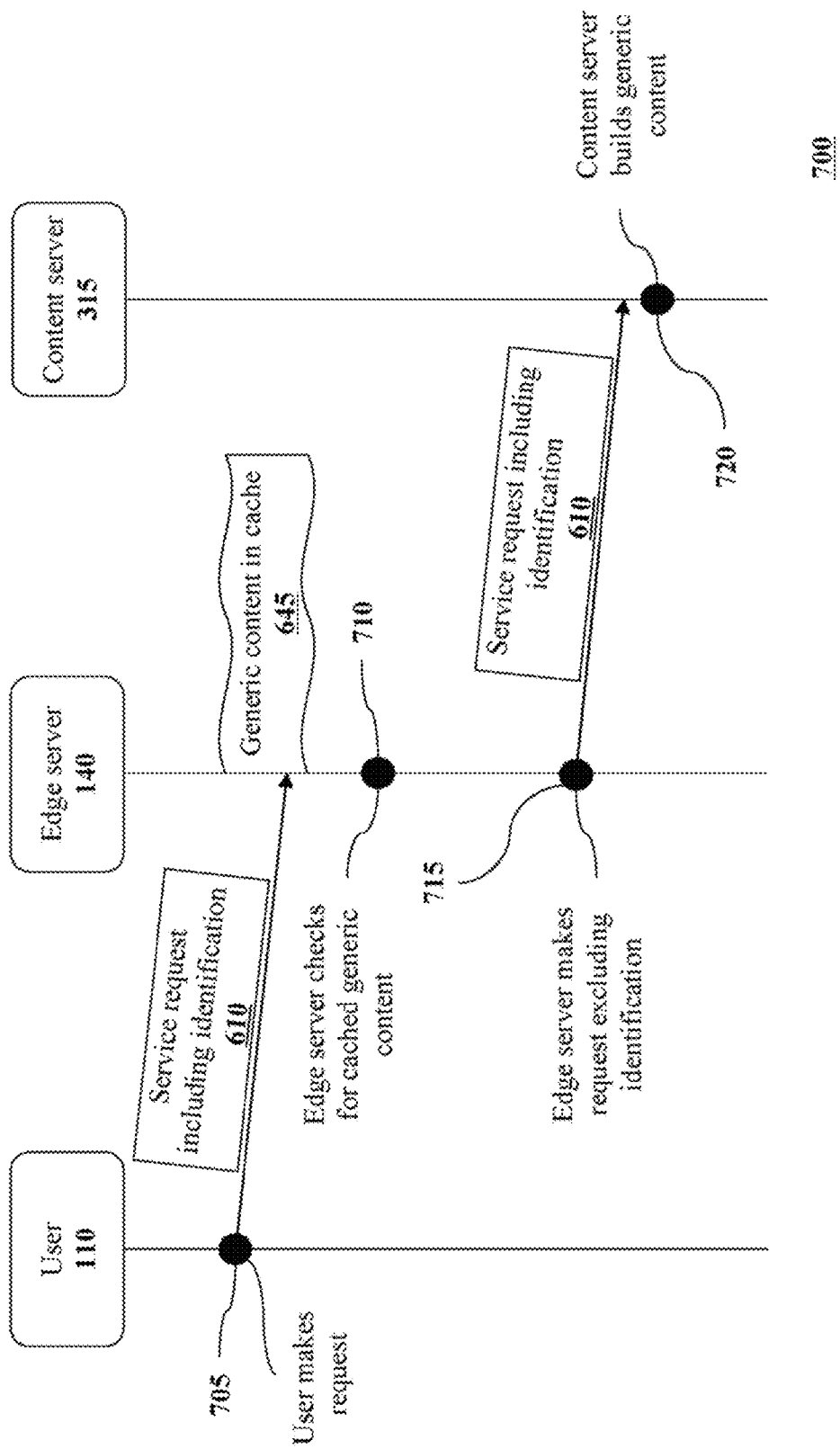
FIG. 7 is a time-line chart for a caching process following a content request for generic content according to an embodiment.

FIGS. 6 and 7 depict a time-line chart for a caching process and generic content request following a content request from a user according to an embodiment.

FIG. 6 depicts the time-line chart for caching when the requested content is not found in the cache unit 410.

At time 605, a user 110 sends a content request including identification 610 to an edge server 140. The identification may include one or more cookies that identify the user 110, a user agent that identifies a browser type of the user 110, the device used by the user, the language of the user, etc.

At time 615, when the edge server 140 has received the content request including identification 610, the edge server 140 checks the cache unit 410 using the cached content determining unit 415 for cached generic content 412 corresponding to the content request. In the time-line of FIG. 6 the edge server 140 does not find the generic content corresponding to the content request, therefore, at time 620 the edge server 140 makes a request for the generic content by removing cookies and the user agent from the request to a form Content request excluding identification 625.

The content server 315 receives the request, and at time 630, the content server 315 builds generic content using the content builder unit 510. The content builder unit 510 obtains the generic content 635 from the generic content database 515 and returns the generic content 635 to the edge server 140. The edge server 140 receives the generic content 635, and at time 640, the control unit 435 caches the generic content 635 in the cache unit. 410 as cached content 412. When the generic content 635 is cached, at time 645 the edge server 140 makes a request including identification 610 to the content server 315 using the content-requesting unit 420. The content server 315 receives the request including identification 610 and at time 650, the content builder unit 510 builds the content based on the request. The content builder unit 510 obtains the generic content from the generic content database 515 based on the request, and obtains the customization information from the customization database 520 based on the identification information in the form of cookies and user agents.

FIG. 7 depicts the time-line chart for caching when the requested content is found in the cache unit 410.

At time 705, a user 110 sends a content request including identification 610 to an edge server 140. The identification may include one or more cookies that identify the user 110 and a user agent that identifies a browser type of the user 110, the device used by the user, the language of the user etc.

At time 710, when the edge server 140 has received the content request including identification 610, the edge server 140 checks the cache unit 410. The edge server 140 checks for cached generic content 412 corresponding to the content request using the cached content determining unit 415. In the time-line of FIG. 7 the edge server 140 finds the generic content in the cache 645 corresponding to the content request, therefore, the edge server 140 does not request any generic content.

At time 715, the edge server 140 makes a request including identification 610 to the content server 315 using the content-requesting unit 420. The content server 315 receives the request including identification 610, and at time 720, the content builder unit 510 builds the content based on the request. The content builder unit 510 obtains the generic content from the generic content database 515 based on the request, and obtains the customization information from the customization database 520 based on the identification information in the form of cookies and user agents.

Figure 8:
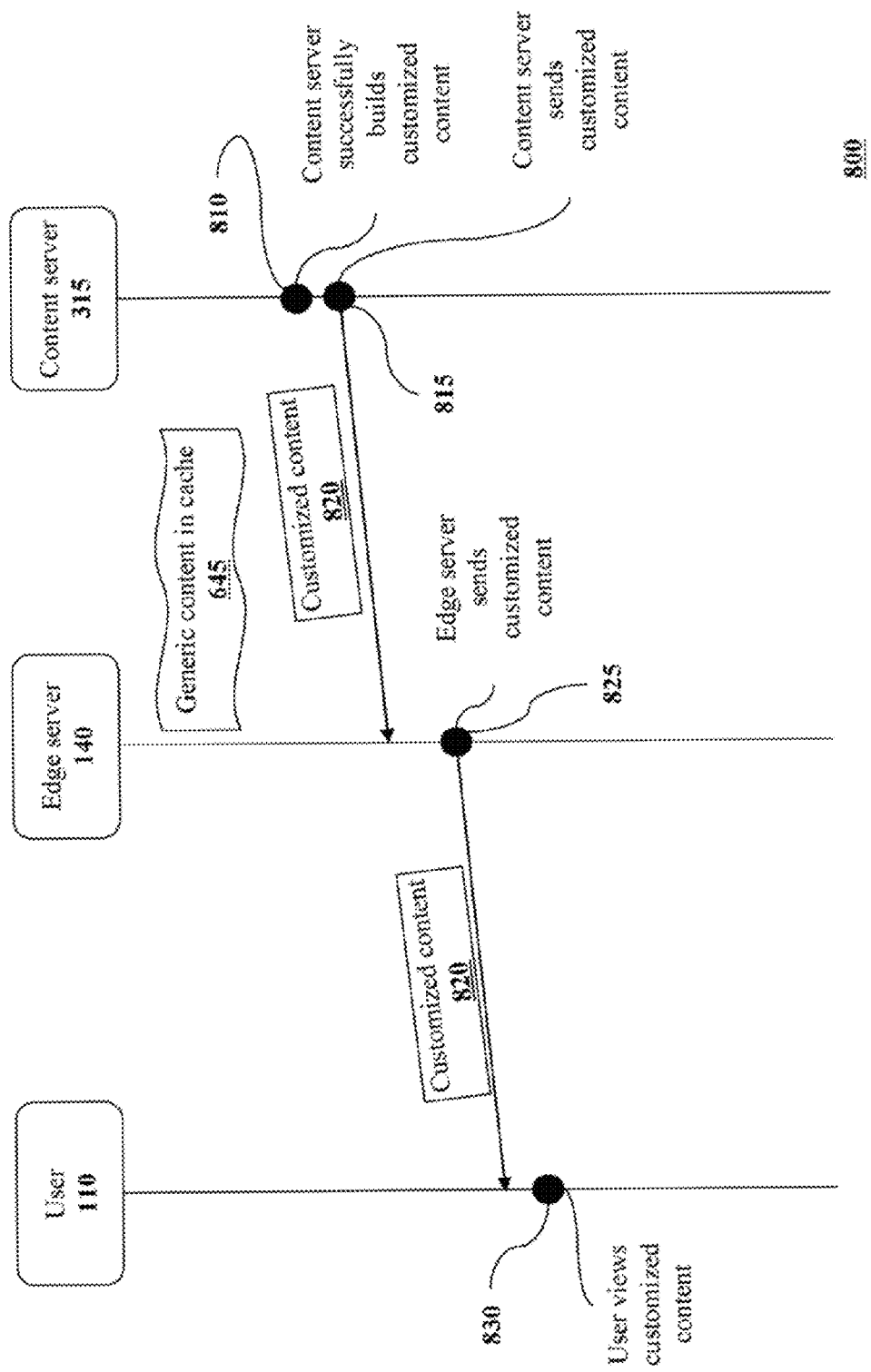
FIG. 8 is a time-line chart for customized content delivery of customized content according to an embodiment.
Figure 9:
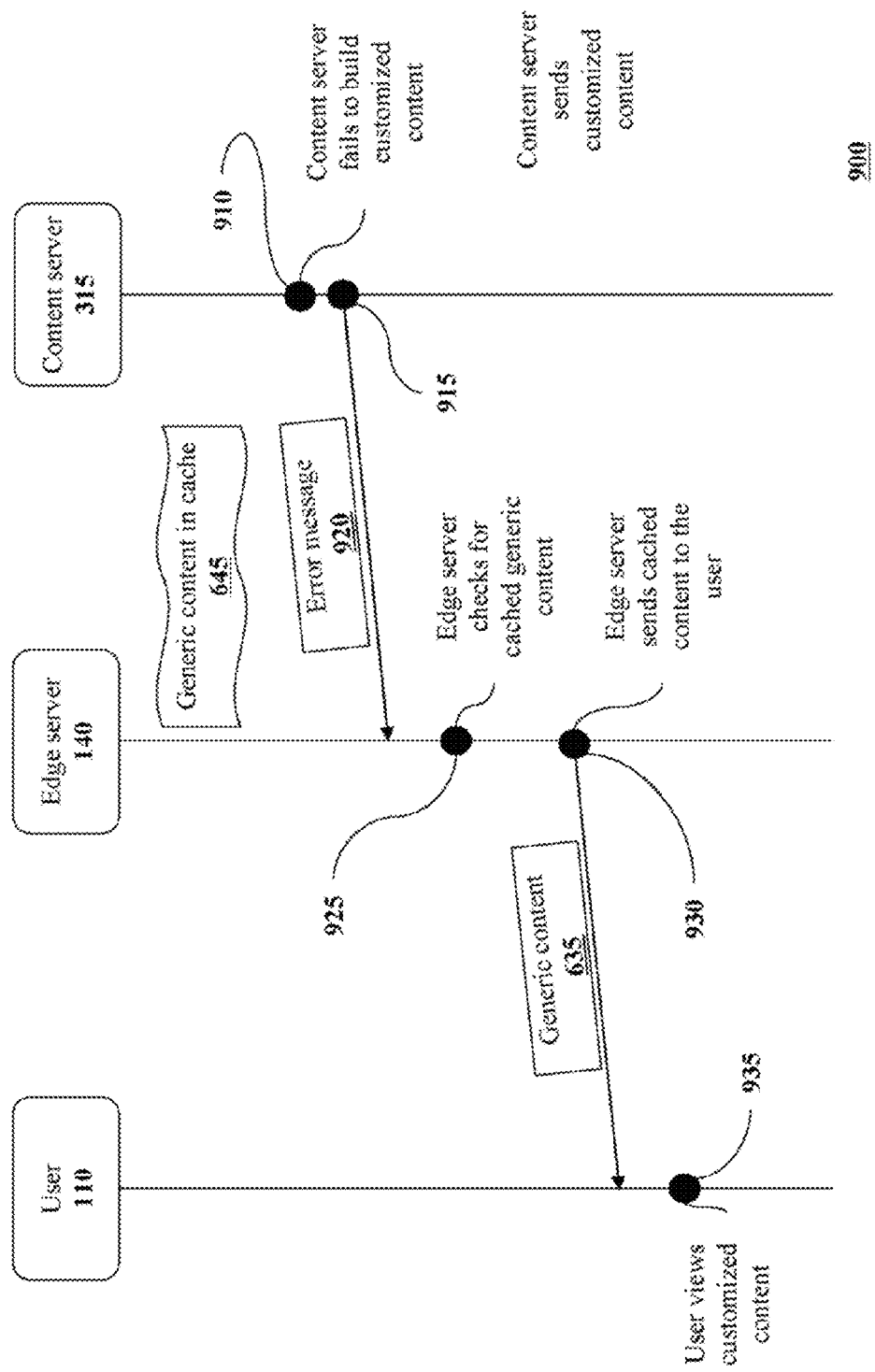
FIG. 9 is a time-line chart for generic content delivery of customized content according to an embodiment.
Figure 10:
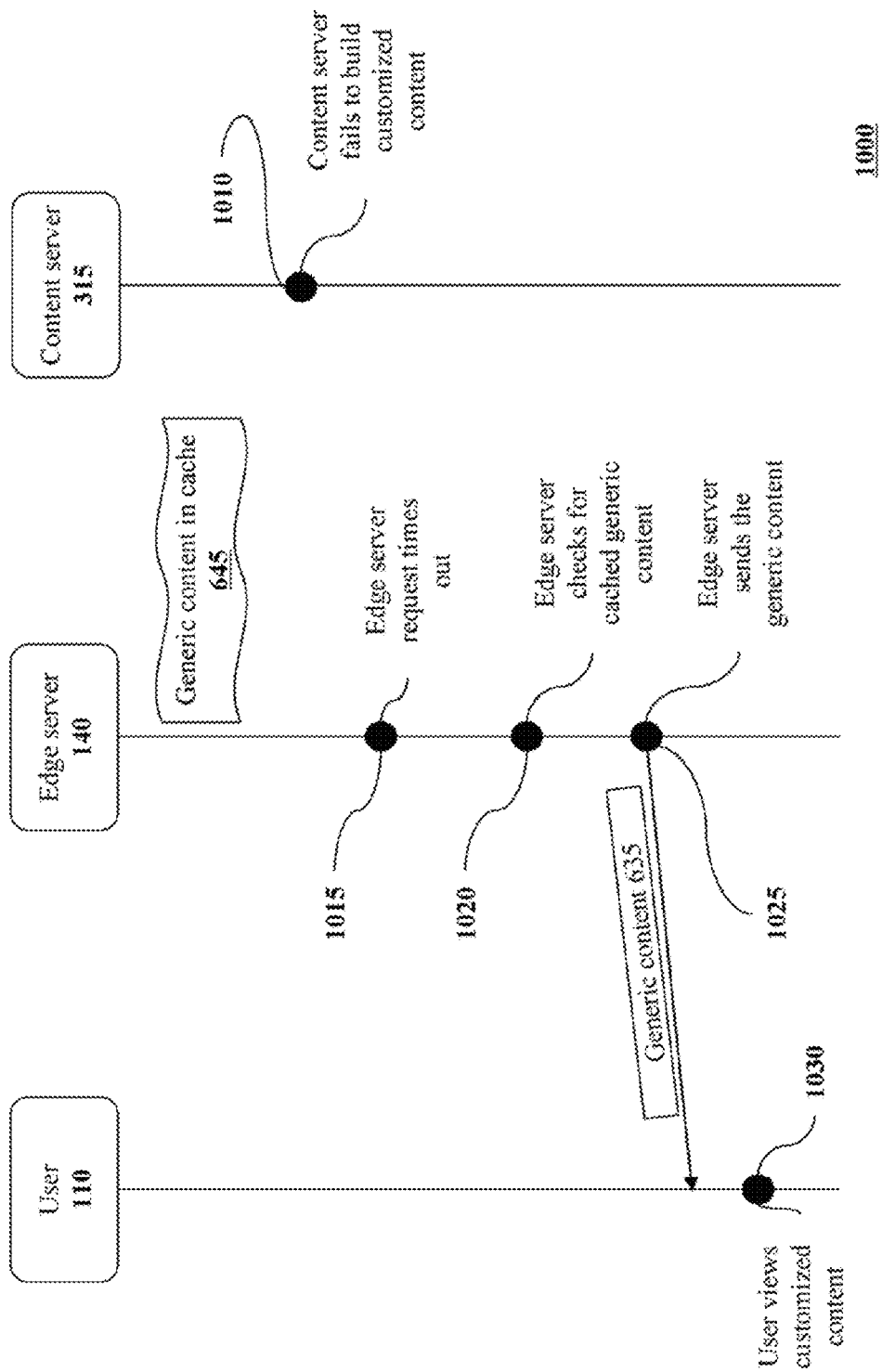
FIG. 10 is a time-line chart for generic content delivery of customized content according to an embodiment.

FIGS. 8-10 depict different time-line charts depending on whether the content server 315 delivers the requested customized content according to an embodiment.

FIG. 8 is a time-line chart for the case that the content server 315 delivers the requested customized content.

At time 810 the content server 315 successfully builds generic content in response to the request including identification 610 from the edge server 140, as depicted in FIGS. 6 and 7. At time 815, the content server 315 sends the customized content 820 to the edge server 140. The edge server 140 receives the customized content 820 using the content-receiving unit 445, and at time 825 forwards the customized content 820 to the user 110 using the content-sending unit. At time 830, the user 110 views the customized content 820.

FIG. 9 is a time-line chart for the case that the content server 315 fails to build the requested customized content.

At time 910, the content server 315 fails to build customized content in response to the request including identification 610 from the edge server 140, as depicted in FIGS. 6 and 7. At time 915, the content server 315 sends an error message 920 to the edge server 140. The edge server 140 receives the error message 920, and at time 925 the edge server 140 checks for cached generic content corresponding to the request for content from the user. At time 930, the edge server 140 obtains the generic content in the cache 645 and sends the generic content 635 to the user 110. At time 935, the user 110 views the generic content 635.

FIG. 10 is a time-line chart for the case that the content server 315 fails to deliver the requested customized content.

At time 1010, the content server 315 fails to build customized content in response to the request including identification 610 from the edge server 140, as depicted in FIGS. 6 and 7. At time 1015, the timer 425 times out and the content requesting unit 420 assumes that the customized content will not be delivered. At time 1020, the edge server 140 checks for cached generic content corresponding to the request for content from the user 110. At time 1025, the edge server 140 obtains the generic content in the cache 645 and sends the generic content 635 to the user 110. At time 1030, the user views the generic content 635.

Figure 11:
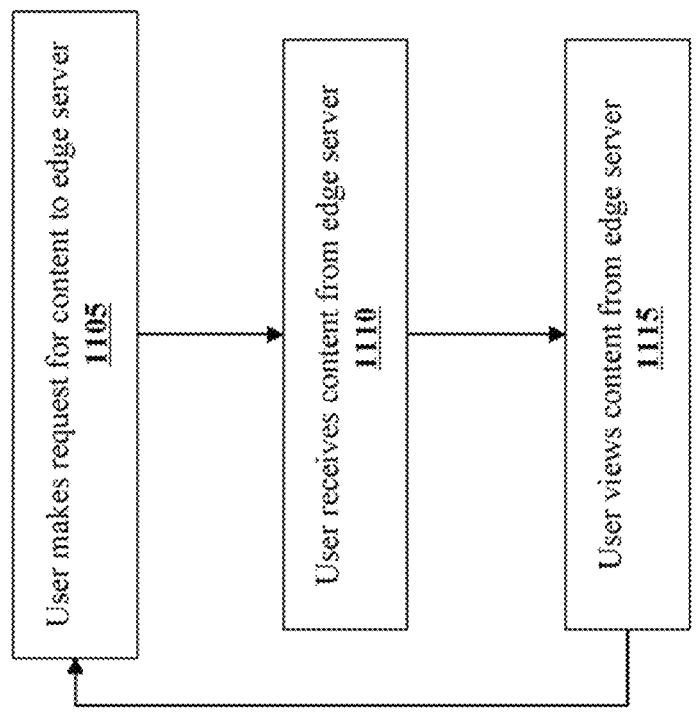
FIG. 11 is a flow chart for a process of delivering content to a user according to an embodiment.

FIG. 11 is a flow chart for a process 1100 of delivering content to a user according to an embodiment. The method begins at step 1105. At step 1105, the user 110 makes a request for content to the edge server 140. At step 1110, the user 110 receives content from edge server 140. At step 1115, the user 110 views content from edge server 140.

Figure 12A:
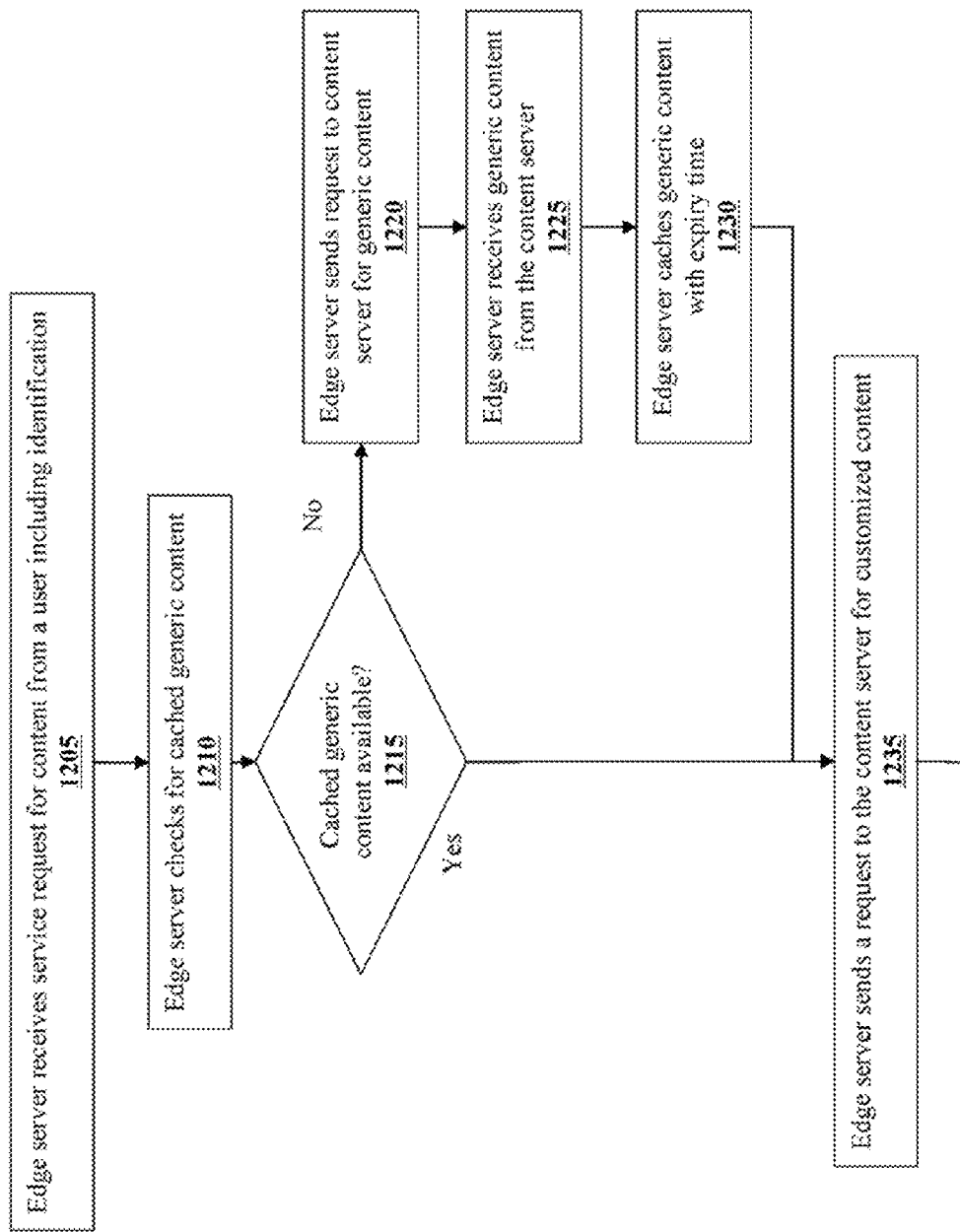
FIG. 12A-B is a flow chart for a process of delivering content to a user according to an embodiment.
Figure 12B:
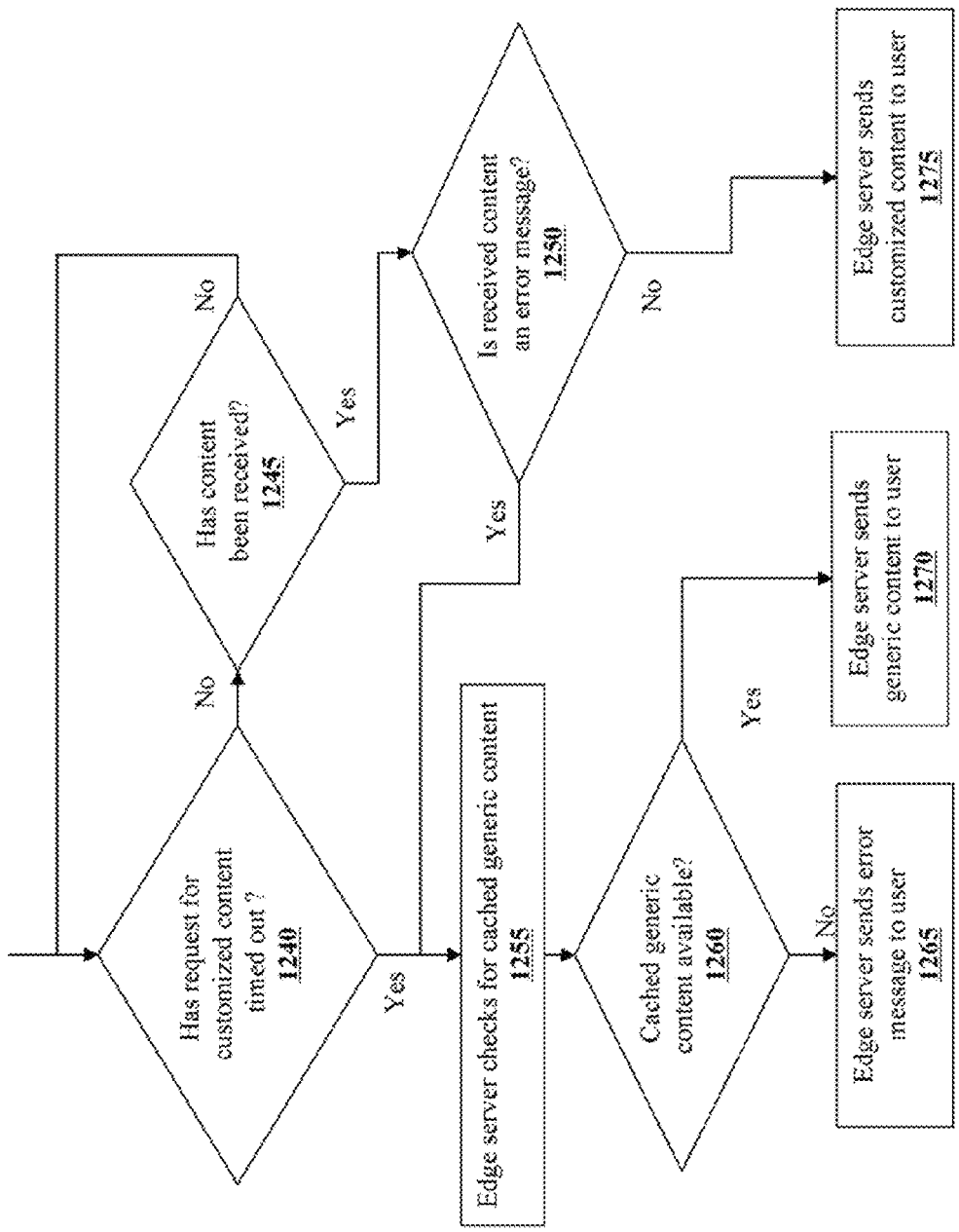

FIG. 12A-B is a flow chart for a method of delivering content to a user according to an embodiment. The method begins at step 1205. At step 1205, the edge server 140 receives a service request for content from a user including identification 610. At step 1210, the edge server 140 checks for cached generic content 645. At step 1215, the edge server 140 determines whether the cached generic content 645 is available. If the cached generic content 645 is available the method proceeds to step 1235. If the cached generic content 645 is not available the method proceeds to step 1220.

At step 1220, the edge server 140 sends a request to the content server 315 for generic content 645. At step 1225, the edge server 140 receives generic content from the content server 315. At step 1230, the edge server 140 caches the generic content 645 with an expiry time. The expiry time is used to indicate when the cached content has expired; The cached content may expire because, for example, the generic content is news content that is rewritten once a day or is transient information such as stock prices that are updated every 15 minutes. The expiry time prevents out-of-date generic content from reaching the user 110. If generic content 645 is found in the cache unit 410 with an expired time, the generic content is considered unavailable.

At step 1235, the edge server 140 sends a request to the content server for customized content and notes the time that the request was sent. At step 1240, the edge server 140 determines whether the request for customized content timed out. The edge server waits for a predetermined time from the time that the request was sent. If a response is not received within that time, then the edge server 140 determines that the request has timed out. In some embodiments, the timeout period is a fixed predetermined time. In some embodiments, the timeout period varies depending on the conditions of the network. Thus, in times of congestion, the timeout period may be extended. If the request has timed out, the method proceeds to step 1255. If the request has not timed out, the method proceeds to step 1245.

At step 1245, the edge server 140 determines whether the content has been received. If the content has been received the method proceeds to step 1250. If the content has not been received, the method repeats from step 1240.

At step 1250, the edge server 140 determines whether the received content is an error message. If the received content is an error message rather than the requested content, the method proceeds to step 1255, If the received content is the requested content, the method proceeds to step 1275.

At step 1255, the edge server 140 checks for cached generic content 412, 645 in the cache unit 410 using the cached content determining unit 415.

At step 1260, the cash content determining unit 415 determines if the cached content corresponding to the requested content is available. If the cached content corresponding to the requested content is available, the method proceeds to step 1270. If the cached content corresponding to the requested content is not available, the method proceeds to step 1265. At step 1265, the edge server 140 sends error message to user. At step 1270, the edge server 140 sends generic content to user. At step 1275, the edge server 140 sends customized content to user.

Figure 13:
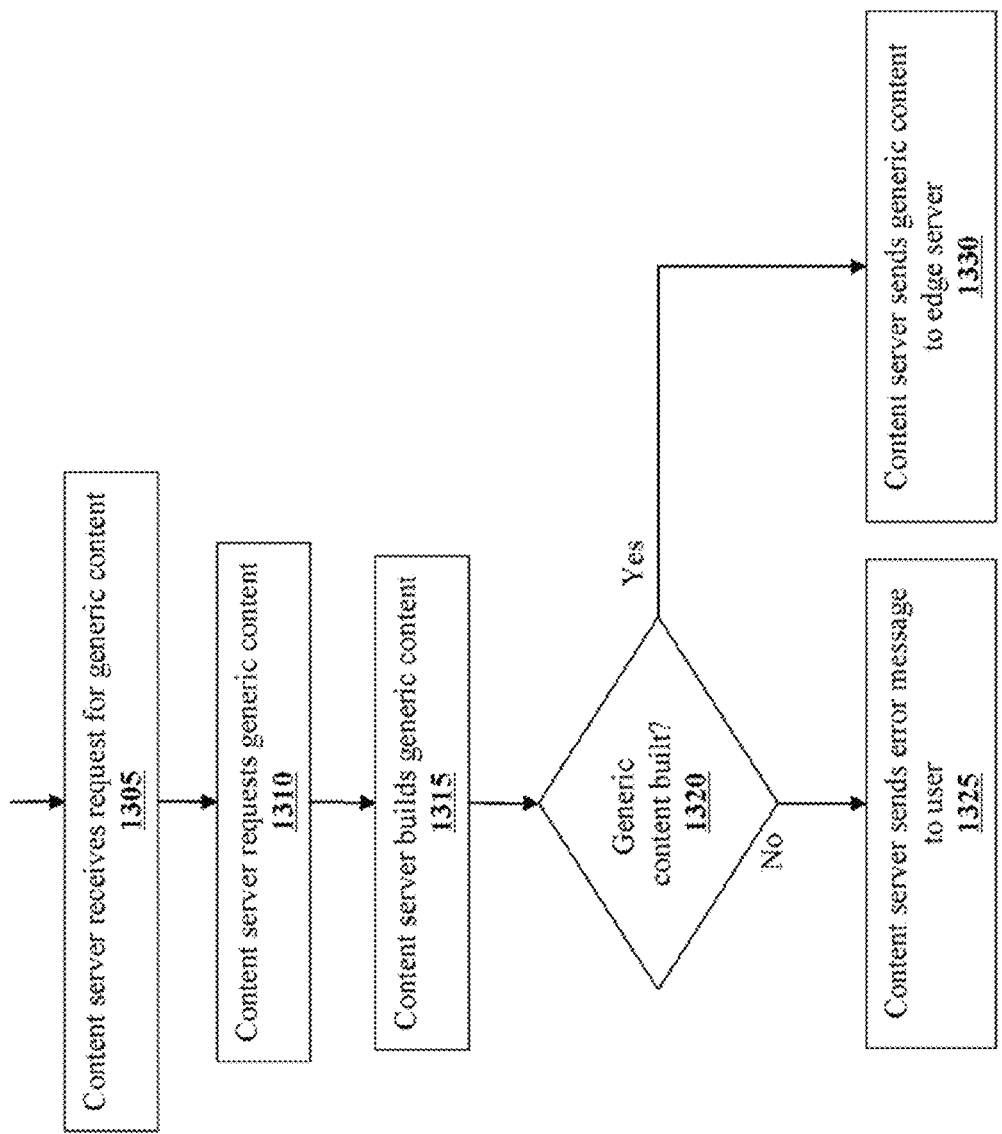
FIG. 13 is a flow chart for a process of delivering generic content to an edge server according to an embodiment.

FIG. 13 is a flow chart for a method of delivering content to an edge server according to an embodiment.

The method begins at step 1305. At step 1305, the content server 315 receives a request for customized content from an edge server, for example, edge server 140. A request for generic content, is a request for content that does not contain any information identifying a user or customer for which the content is intended.

At step 1310, the content server 315 requests generic content corresponding to the requested content from the generic content database 515. In some embodiments, if the generic content corresponding to the requested content is not in the generic content database, the content server 315 returns an error message to the edge server.

At step 1315, the content server 315 builds the generic content requested. The generic content is based on the requested generic content from the generic content database 515.

At step 1320, the content server 315 determines if the generic content is built. If the generic content is built successfully, the method proceeds to step 1330. If the generic content is not built successfully, the method proceeds to step 1325.

At step 1325, the content server 315 sends an error message to the edge server 140. At step 1330, the content server 315 sends the customized content to the edge server 140.

Figure 14:
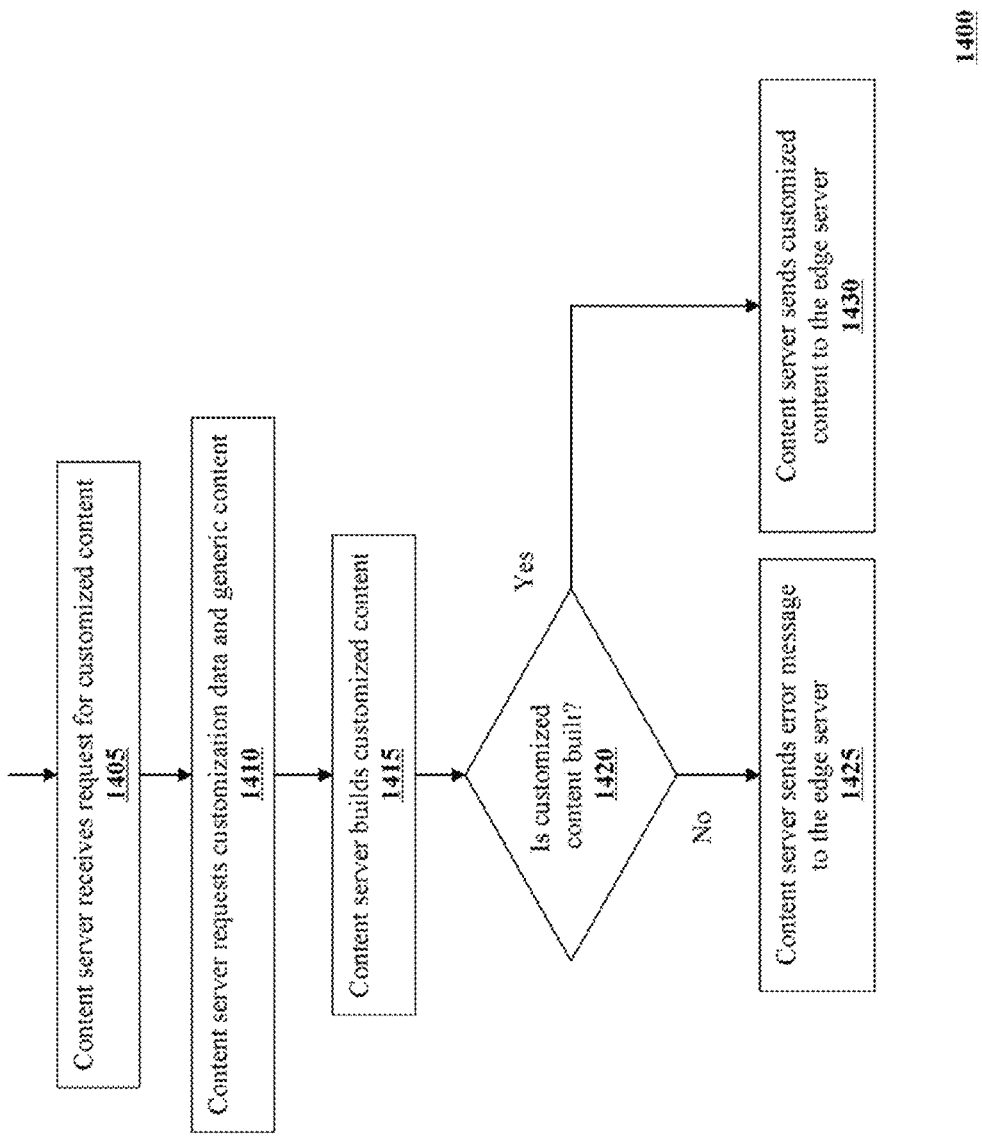
FIG. 14 is a flow chart for a process of delivering custom content to an edge server according to an embodiment.

FIG. 14 is a flow chart for a method 1400 of delivering customized content to an edge server according to an embodiment. The method begins at step 1405. At step 1405, the content server 315 receives a request for customized content from an edge server 140. The request for customized content includes identification of a user 110 for which generic content should be customized to form customized content.

At step 1410, the content server 315 requests customization data from the customization database 520 and generic content from the generic content database 515. The generic content is requested based on the customized content request. The customization data request is based on the identity of the user 110 for which the generic content is to be customized. In some embodiments, if the generic content corresponding to the requested content or the customization data corresponding to the user 110 is not in the generic content database, the content server 315 returns an error message to the edge server 140.

At step 1415, the content server 315 builds the customized content by building the generic content and customizing the generic content with the data from the customization database 520.

At step 1420, the content server 315 determines if customized content is built. If the customized content is successfully built, the method proceeds to step 1430. If the customized content is not successfully built, the method proceeds to step 1425.

At step 1425, the content server 315 sends an error message to the edge server 140. At step 1430, the content server 315 sends customized content to the edge server 140.

Figure 15:
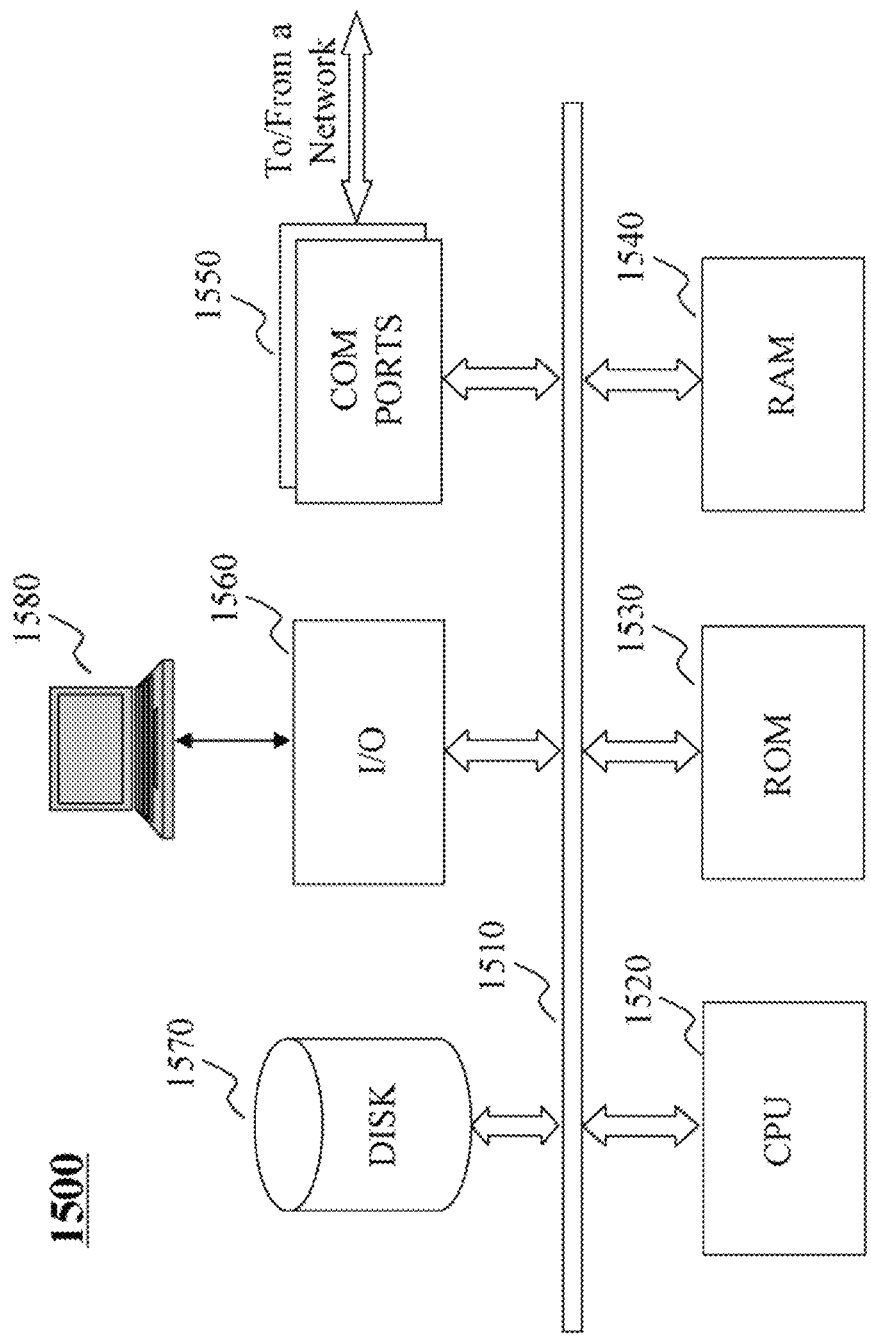
FIG. 15 depicts a general computer architecture on which the present teaching can be implemented.

FIG. 15 depicts a general computer architecture on which the present teaching can be implemented and has a functional block diagram illustration of a computer hardware platform which includes user interface elements. The computer may be a general-purpose computer or a special purpose computer. This computer 1500 can be used to implement any components of the fault tolerant edge server as described herein. For example, the edge server 140 and the content server 315 can be implemented on a computer such as computer 1500, via its hardware, software program, firmware, or a combination thereof. Although only one such computer is shown, for convenience, the computer functions relating to edge server caching and content delivery may be implemented in a distributed fashion on a number of similar platforms, to distribute the processing load.

The computer 1500, for example, includes COM ports 1550 connected to and from a network connected thereto to facilitate data communications. The computer 1500 also includes a central processing unit (CPU) 1520, in the form of one or more processors, for executing program instructions. The exemplary computer platform includes an internal communication bus 1510, program storage and data storage of different forms, e.g., disk 1570, read only memory (ROM) 1530, or random access memory (RAM) 1540, for various data files to be processed and/or communicated by the computer, as well as possibly program instructions to be executed by the CPU. The computer 1500 also includes an I/O component 1560, supporting input/output flows between the computer and other components therein such as user interface elements 1580. The computer 1500 may also receive programming and data via network communications.

Hence, aspects of the methods of fault tolerant edge servers, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of the service provider 134 or other platform into the hardware platform(s) of a computing environment or other system implementing a computing environment or similar functionalities in connection with the edge server caching and content delivery. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented as a software only solution—e.g., an installation on an existing server. In addition, systems and their components as disclosed herein can be implemented as a firmware, firm ware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

I claim:

1. A method implemented on a machine having at least one processor, storage, and a communication platform connected to a network for fault tolerant content delivery, the method comprising:
   receiving a first request from a user for customized content on the network, the first request for the customized content comprising identification information related to the user, wherein the customized content is customized based on the identification information;
   determining whether generic content related to the customized content is available in a cache;
   responsive to a determination that the generic content is not available in the cache, sending a second request to a content server for the generic content, wherein the second request is based on the first request without the identification information;
   storing the generic content in the cache, wherein the generic content is associated with an expiration time;
   forwarding the first request over the network to the content server; and
   when the customized content is not received from the content server within a specified period of time, obtaining the generic content from the cache, and sending the generic content to the user in response to the first request.

2. The method of claim 1, further comprising:
   determining whether the generic content is expired based on the expiration time;
   if it is determined that the generic content is expired, sending the second request for the generic content over the network; and
   said obtaining the generic content from the cache comprising, if it is determined that the generic content is not expired,
   retrieving the generic content from the cache, and sending the generic content to the user responsive to the first request.

3. The method of claim 1, wherein the identification information is further related to a device of the user, and the customized content comprises content that is customized for the user or the device of the user based on at least one of user identification information, device identification information, or application identification information.

4. The method of claim further comprising sending an error message to the user as a response to the first request, if no customized content is received in response to the forwarded first request and if no generic content is available.

5. A method implemented on a machine having at least one processor, storage, and a communication platform connected to a network for fault tolerant content delivery, the method comprising:
   receiving a first request from a particular user of a plurality of users for customized content on the network, the first request for the customized content comprising identification information related to the particular user, wherein the customized content is customized based on the identification information;
   determining whether generic content is available in a cache, wherein the generic content includes content that is not specific to any of the plurality of users;
   responsive to a determination that the generic content is not available in the cache, sending a second request to a content server for the generic content, wherein the second request is based on the first request without the identification information;
   storing the generic content in the cache, wherein the generic content is associated with an expiration time;
   forwarding the first request over the network to the content server; and
   when the customized content is not received from the content server within a specified period of time, obtaining the generic content from the cache, and sending the generic content to the user in response to the first request.

6. The method of claim 5, further comprising:
   determining whether the generic content is expired based on the expiration time;
   if it is determined that the generic content is expired, sending the second request for the generic content over the network; and
   said obtaining the generic content from the cache comprising, if it is determined that the generic content is not expired, retrieving the generic content from the cache, and sending the generic content to the user on the network.

7. A non-transitory machine-readable medium having information recorded thereon, wherein the information, when read by a machine, causes the machine to perform operations related to a fault tolerant content delivery method, the operations comprising:
   receiving, by a first server, a first request from a user for customized content on the network, the first request for the customized content comprising identification information related to the user, wherein the customized content is customized based on the identification information;
   determining whether generic content related to the customized content is available in a cache;
   responsive to a determination that the generic content is not available in the cache, sending a second request to a second server for the generic content, wherein the second request is based on the first request without the identification information;
   storing the generic content in the cache, wherein the generic content is associated with an expiration time;
   forwarding the first request to the second server on the network; and
   when the customized content is not received from the second server within a specified period of time, obtaining the generic content from the cache, and sending the generic content to the user in response to the first request.

8. The non-transitory machine-readable medium of claim 7, further comprising:
determining whether the generic content is expired based on the expiration time;
if it is determined that the generic content is expired, sending the second request for the generic content over the network; and
said obtaining the generic content from the cache comprising, if it is determined that the generic content is not expired, retrieving the generic content from the cache, and sending the generic content to the user.

9. A system for reliable content delivery comprising:
a memory and a processor coupled to the memory, wherein the processor is configured to:
receive a first request from a user, over a network for customized content on the network, the first request for the customized content comprising an identification information related to the user, wherein the customized content is customized based on the identification information;
determine whether generic content related to the customized content is available in a cache;
responsive to a determination that the generic content is not available in the cache, send a second request to a content server for the generic content, wherein the second request is based on the first request without the identification information;
store the generic content in the cache, wherein the generic content is associated with an expiration time;
forward the first request over the network to the content server; and
when the customized content is not received from the content server within a specified period of time, obtain the generic content from the cache, and send the generic content to the user in response to the first request.

10. The system according to claim 9, further comprising: a generic content database comprising a second set of generic content; and
a content bulkier unit configured to build at least one of generic content or requested customized content based on a request for customized content and the second set of generic content.

11. The system according to claim 10, wherein the content builder unit is configured to build customized content if the content builder unit receives a request for content that includes at least one of user identification information, device identification information, or application identification information.

12. The system according to claim 10, wherein the content builder unit is configured to build generic content if the content builder unit receives a request for content that includes no identification information.

* * * * *